(12) United States Patent
Sheikh

(10) Patent No.: US 9,119,166 B1
(45) Date of Patent: *Aug. 25, 2015

(54) INTERPERSONAL COMMUNICATION AND INTERACTIVE INFORMATION SYSTEM

(76) Inventor: Babak Sheikh, Weston, FL (US)

( * ) Notice: Subject to any disclaimer, the term of this patent is extended or adjusted under 35 U.S.C. 154(b) by 462 days.

This patent is subject to a terminal disclaimer.

(21) Appl. No.: 13/573,215

(22) Filed: Aug. 30, 2012

Related U.S. Application Data

(63) Continuation-in-part of application No. 13/471,122, filed on May 14, 2012, now Pat. No. 8,914,039, which is a continuation-in-part of application No. 12/389,706, filed on Feb. 20, 2009, now Pat. No. 8,180,369.

(51) Int. Cl.
H04W 64/00 (2009.01)

(52) U.S. Cl.
CPC ..................... *H04W 64/00* (2013.01)

(58) Field of Classification Search
CPC ..................................... H04W 24/00
USPC ................ 455/456.1–456.6, 414.1, 446, 566, 455/435.1–435.2

See application file for complete search history.

(56) References Cited

U.S. PATENT DOCUMENTS

| | | |
|---|---|---|
| 8,155,673 B2 | 4/2012 | Alizadeh-Shabdiz et al. |
| 2006/0208860 A1 | 9/2006 | Park et al. |
| 2012/0072106 A1 | 3/2012 | Han et al. |
| 2012/0088524 A1 | 4/2012 | Moldavsky et al. |
| 2012/0098700 A1 | 4/2012 | Diggelen |

*Primary Examiner* — Michael T Vu
(74) *Attorney, Agent, or Firm* — Ronald V. Davidge

(57) ABSTRACT

An interpersonal communication and an interactive information system is disclosed, through which a user can access a wireless local area network within a facility from a compatible mobile device, obtain information specific to the user's location and communicate with other mobile devices in the facility location through the wireless local area network. The user can establish communications through the network by reading a tag specific to the facility using the mobile device, and locations of the mobile device within the facility are established by reading other tags using the mobile device, by reading radio-frequency signals, or through a GPS system.

20 Claims, 11 Drawing Sheets

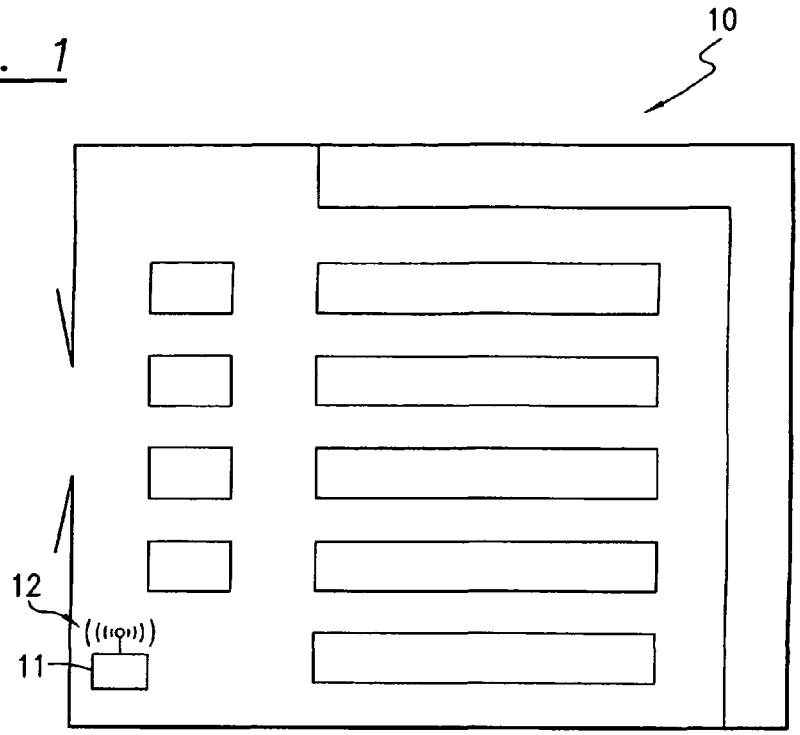
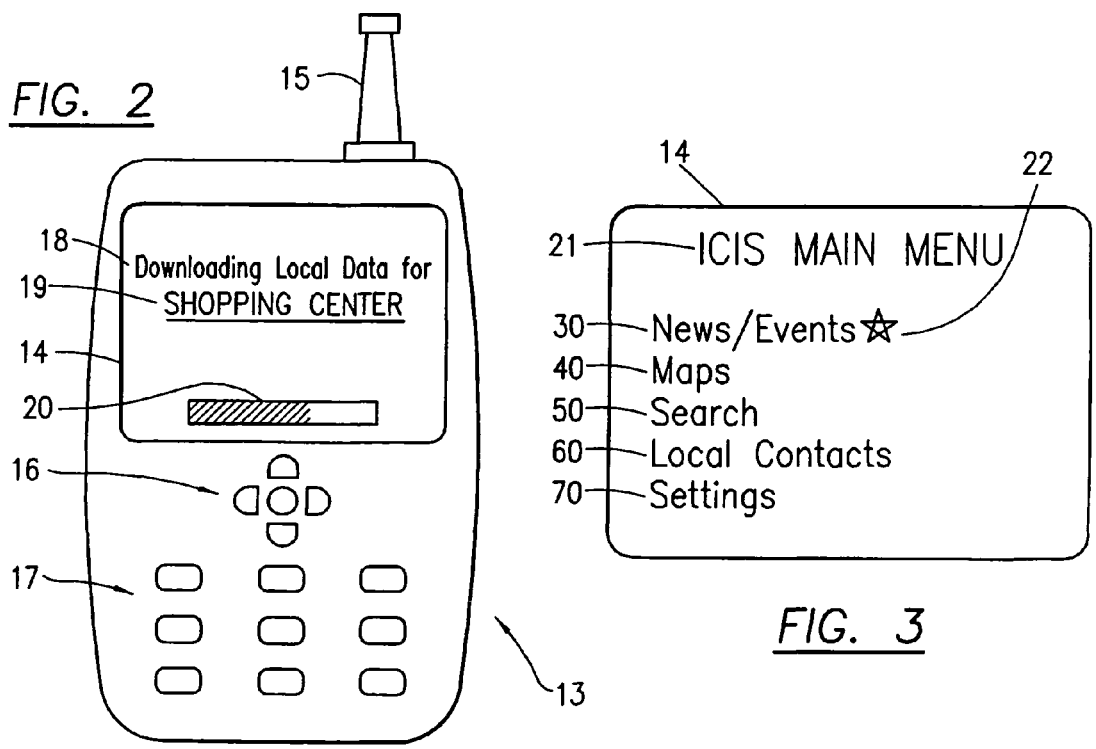

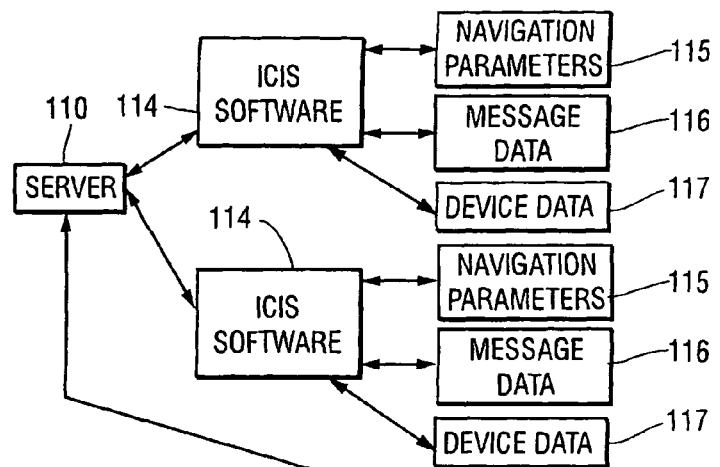
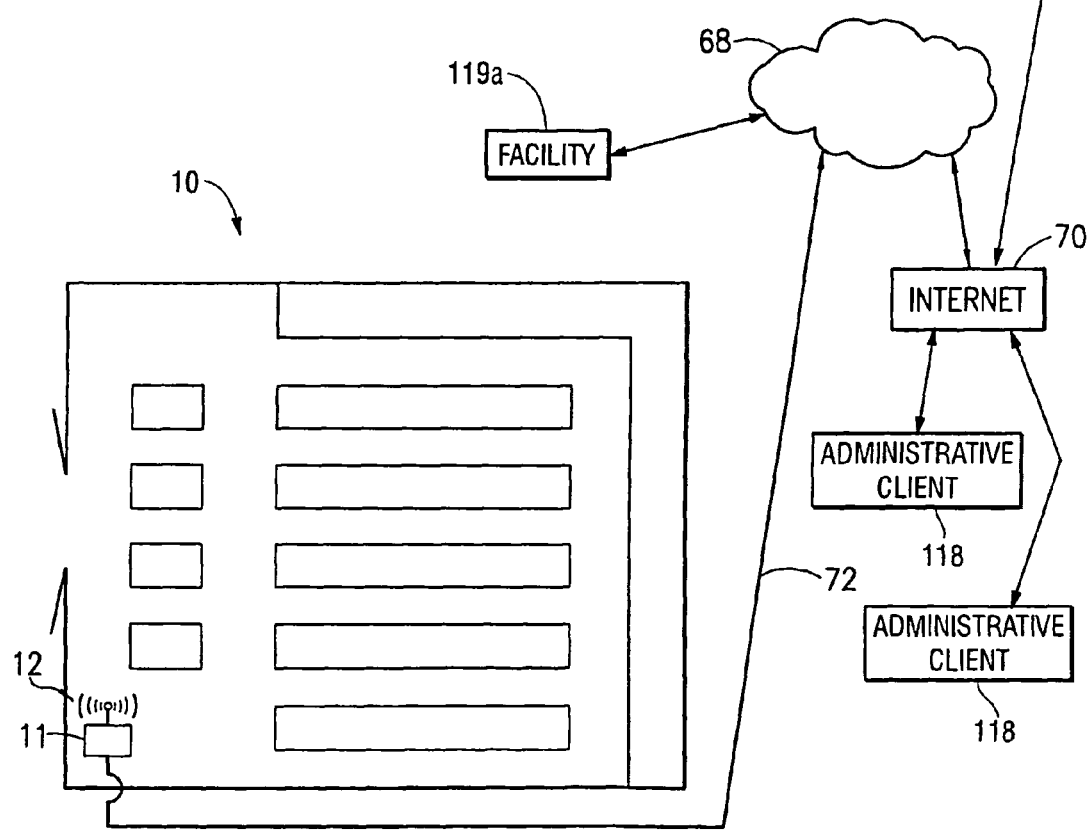
FIG. 11

INTERPERSONAL COMMUNICATION AND INTERACTIVE INFORMATION SYSTEM

CROSS REFERENCE TO RELATED APPLICATIONS

This application is a continuation-in-part of U.S. patent application Ser. No. 13/471,122 now U.S. Pat. No. 8,914,039, filed May 14, 2012, which is a continuation-in-part of U.S. patent application Ser. No. 12/389,706, filed Feb. 20, 2009, now issued as U.S. Pat. No. 8,180,369.

BACKGROUND OF THE INVENTION

1. Field of the Invention

This invention relates generally to an interpersonal communication and an interactive information system, and specifically to a system that allows a user to use a mobile device to interactively acquire real time information about a facility in which the device is presently located and communicate with other devices at the facility. The system can employ cloud computing.

2. Description of Related Art

Handheld communication devices have become more and more prevalent in the day to day lives of people in our society. In addition, the reliability, capability, and convenience of such devices has dramatically improved. What began as car phones and bulky pagers have evolved into devices with ever increasing mobility, a constant stream of new features, as well as dramatically increased reliability and battery life, all while the size of the devices has decreased. Today, it is common to see extremely powerful handheld devices that are able to send and receive calls, messages, and emails, utilize GPS systems, and perform many computing functions such as PDA functions, word processing, and web surfing, and see these devices fit in the palm of someone's hand.

Similarly, the spread of wireless communications, including cell phone communication networks, wireless local area networks (WLAN or Wi-Fi), and the Bluetooth protocol has greatly influenced the communicative and informational potential in people's lives. The growth of mobile communication and data based services has made constant contact with other people and immediate access to all types of data commonplace in many people's lives. Moreover, it is not uncommon for a home, a small business, a mall, or even a city to broadcast its own WLAN, providing general access to the Internet for all those who can access the network. Further, as such technologies become more powerful, efficient and more reliable, their growth and influence on society will continue to grow.

While the Internet alone can seemingly provide an endless access to communication and information services in general, there remains a need for more specific and localized communication and information services. This need is met in some respects by intranets and other local networks. These types of networks often provide detailed information, keep the information more up to date, and pertain more to specialized or localized needs. Intranets are often used by businesses and by universities to attempt to meet this need.

However, with the promulgation of wireless technology, these local networks could be more effectively used in existing settings and also used in additional settings. Many commercial settings could greatly benefit from allowing visitors to access a locally provided, wireless network through the patrons' own handheld device and providing relevant content and various services to enhance the visitor's experience. Therefore, what is needed is a communication and information system that can utilize a WLAN to provide localize informational services and localized communicative services to users of the system on the users' own compatible handheld device.

SUMMARY OF THE INVENTION

In accordance with several aspects of the invention, methods are provided for providing a local network based within a facility, in which the local network provides local information and access to a local interpersonal communication service. The methods each include the steps of hosting a facility hosted data transmission signal, establishing a connection between the computer host associated with the facility and one or more of the participating mobile devices, providing an information and communications software program to be loaded onto the one or more participating mobile devices, and enabling, by the local interpersonal communication service, the participating mobile devices identified by the software program to be visible to one another. The facility hosted data transmission signal that enables the transmission of electronic data wirelessly between a computer host associated with the facility and one or more participating mobile devices and also enables the transmission of the electronic data wirelessly between two or more of the participating mobile devices, the mobile devices comprising a visual display and adapted to transmit and receive data over the local data transmission signal. The information and communication software program receives facility-specific auxiliary data and provides the one or more participating mobile devices with local and facility information and access to the interpersonal communication service; wherein the software program enables the transmission signal to identify the mobile device and enables the mobile devices to be visible to one another and to transmit data over the transmission signal and receive data originating locally on the transmission signal.

In accordance with one such aspect of the invention, the method additionally includes providing a facility-specific, machine readable tag, with the connection between the computer host and one or more of the participating mobile devices occurring in response to the one or more of the participating mobile devices reading the information identifying the facility from the facility-specific, machine readable tag.

In accordance with another such aspect of the invention, the method additionally includes providing a plurality of location-specific machine-readable tags at a plurality of locations within the facility, wherein each of the machine-readable tags provides information describing a location where the tag is placed, with the information and communications software program being additionally adapted to operate with the facility-specific software program to determine a location of each of the location-specific machine readable tags from information read from the tag. This allows the local interpersonal communications to enagvle the participating mobile devices identified by the software to recognize one another with their locations.

In accordance with yet another aspect of the invention, each of the participating mobile devices is adapted to establish a connection with the host computing system through a Wi-Fi access point and alternatively through a cellular communications tower in response to determining the qualities of signals from the access point or the cellular communications tower The host computing system may be connected to a Wi-Fi access point within the facility, with the one or more participating mobile devices each being adapted to contact the host computer through the Wi-Fi access point in response to reading the facility-specific, machine readable tag. Alternately, the host computing system comprises a server connected to the Internet, with the one or more participating mobile devices each being adapted to contact the host computer through the Internet in response to reading the facility-specific, machine readable tag Each of the machine-readable tags may contain a bar code that is read from a photograph taken of the tag by a software program running within each of the mobile devices, or each of the machine-readable tags may contain a radio frequency identification device (RFID) that emits an encoded radio frequency signal that is read by an RFID reader within the mobile device or attached thereto.

The communication and information system described herein is embodied in the Interactive Communication and Information Service ("ICIS") software developed by applicant and installed on a computer host and mobile devices used herein. The ICIS software comprises an ICIS host software and an ICIS user app.

In a first embodiment of the invention, a facility offering the ICIS to its visitors must provide a computer host and a wireless local area network. The computer host is ideally a server or other high powered computer and must have the ICIS host software installed on it. The wireless local area network is connected to the computer host and is needed to transmit the locally hosted data transmission signal that enables the transmission of electronic data wirelessly between mobile devices. This data transmission signal is a WLAN (or Wi-Fi network) or a Bluetooth protocol network.

In a second embodiment of the invention, cloud Internet-based computer services could be used. The facility computer host at the facility could be connected using the Internet to a cloud based computer service. A cloud computer service provider has a server that could act as the computer host off-site and communicate with a local host facility computer using the Internet. The facility that uses ICIS thus engages a cloud-based service provider to store and maintain the data necessary for ICIS, including the necessary software programs to run ICIS. Thus, the host computer at the facility will be connected to the Internet and to the cloud computer system provider server that maintains ICIS database information and ICIS software. The purpose of this arrangement is to take advantage of the benefits of cloud computing and to reduce the system requirements of the host computer at the local store facilities.

In a third embodiment of the invention, a tag that can be read using a mobile device within the facility is provided to facilitate the connection of the mobile device with the host facility computer. For example, the tag may be a bar code tag that is read by a camera within the mobile device or a radio-frequency identification (RFID) device that is read by an RFID reader within the mobile device, with this method being used to facilitate the needed connection in either the first embodiment or the second embodiment of the invention.

In a fourth embodiment of the invention, multiple modes are provided for determining the location of the mobile device within the facility, allowing this location to be determined even within a facility where GPS signals cannot be reliably received to determine locations. One mode for determining such a location involves a comparison of radio-frequency signals generated by Wi-Fi access points and/or radio-frequency transmitters and received by the mobile device with functions deriving the location from the levels of such signals within the facility. Another mode is based on reading codes from tags placed at various locations within the facility to be read by the, with the codes including information describing the location. Such tags may be bar code tags read using a camera within the mobile device or RFID tags read by a tag reader within the mobile device.

A mobile device is required to utilize the ICIS. The mobile device must include a visual display and be able to transmit and receive data over a wireless network. Many modern cell phones are equipped to use the ICIS. To access the ICIS, the mobile device must be positioned within range of the transmission signal so that the mobile device is able to transmit and receive data over the transmission signal. The mobile device must also have the ICIS user app installed to log into the ICIS and utilize the services. The ICIS user app may be downloaded and installed prior to entering an ICIS equipped facility or downloaded and installed upon entry into an ICIS equipped facility.

The ICIS user app comprises application programs for informational and communicative services, each of which can be accessed through a navigable main menu, and a graphical user interface. The ICIS host software comprises a graphical user interface, local auxiliary data comprising facility specific maps, new, events, and other pertinent data, data entry software for entry and update of local auxiliary data, a search engine for searching the local auxiliary data, an application program for creating and hosting private chat rooms, and the ICIS user app for download by mobile devices.

When a mobile device that does not have the ICIS user app installed enters a facility with the ICIS and seeks to accesses the ICIS signal, it must first accept the applicable terms and conditions, create a personal identification number ("PIN"), and download and install the ICIS user app. The ICIS user app stores the PIN and uses it in each subsequent login attempt to verify the login attempt. When a mobile phone that has the ICIS user app installed accesses first begins accessing the ICIS signal in an ICIS enabled facility, it must simply enter the PIN previously created. The ICIS host uses the mobile device's PIN as well as the mobile device's phone number or email address to uniquely identify the mobile device within the system.

As soon as a mobile device is logged on to the ICIS, the transmission signal transmits local auxiliary data to the mobile device. The local auxiliary data is facility specific data that enables the ICIS user app to provide facility specific maps, news, events, and other relevant data that the host facility has chose to provide. The ICIS user app uses this information to provide an interactive local news and events service, an interactive map service, and an interactive search engine service.

Logging on to the ICIS also enables a mobile phone to access an interpersonal communication service. The interpersonal communication service allows a first mobile device that is logged into a facility's ICIS to be visible to any second mobile device that is logged onto the same facility's if the first mobile device's contact information (phone number or email address) stored in the phone book or contacts section of the second mobile device. Any first mobile device that is visible to a second mobile device can be invited to and enter into a private chat room to communicate through that facility's ICIS enabled network.

The ICIS provides additional functionality for mobile devices which have GPS service. When a mobile device has an active GPS receiver, the interactive map service uses the location information to overlay the exact location of the mobile device onto the facility map. In addition, when a mobile device has an active GPS receiver, ICIS user app periodically transmits the exact location of the mobile device (along with the mobile device's contact information) to the ICIS computer host for use in conjunction with the interpersonal communication service. The interpersonal communication service uses the GPS positioning information to overlay the location information of all contacts saved on a mobile device onto a facility map.

In accordance with these and other objects which will become apparent hereinafter, the instant invention will now be described with particular reference to the accompanying drawings.

BRIEF DESCRIPTION OF THE DRAWINGS

FIG. 1 shows a top plan view of a shopping center with the ICIS system installed in accordance with the first embodiment of the invention.

FIG. 2 shows a front plan view of a cell phone having Wi-Fi access that includes the ICIS user app described herein.

FIG. 3 shows a front plan view of the screen of a cell phone having Wi-Fi access that includes the ICIS user app described herein.

FIG. 11 shows a second embodiment of the invention that is a top plan schematic view of a store with the ICIS system installed connected to a cloud computing system and the Internet.

DETAILED DESCRIPTION OF PREFERRED EMBODIMENTS

Figure 4:
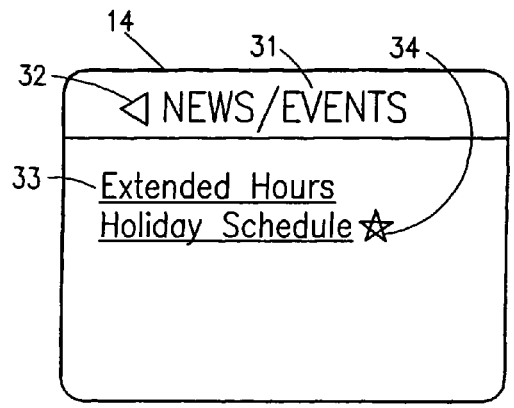
FIG. 4 shows a front plan view of the screen of a cell phone having Wi-Fi access that includes the ICIS user app described herein.

Referring now to the drawings, and in particular, FIG. 1, the ICIS is shown in a defined environment. Within the facility 10, the ICIS comprises a computer host 11, which is a server or other high powered computer and a wireless router 12, which broadcasts a data transmission signal that can preferably be accessed anywhere within the facility 10. The host 11 has the ICIS host software loaded on it, which comprises a graphical user interface, local auxiliary data comprising facility specific maps, new, events, and other pertinent data, data entry software for entry and update of local auxiliary data, a search engine for searching the local auxiliary data, an application program for creating and hosting private chat rooms, and the ICIS user app for download by mobile devices.

Referring now to FIG. 2, a mobile device that has just logged on to the ICIS is shown. The cell phone handset 13 is complete with all of the necessary components of the ICIS, including a visual display screen 14, a Wi-Fi compatible antenna 15, and a manual input. The manual input for this handset 13 comprises a directional pad 16 and a number pad 17. In an alternative version, a handset 13 could lack the directional pad 16 or have the directional pad 16 integrated into the keypad 17. In addition, in other versions of the invention, other types of mobile devices could be used, including but not limited to a PDA device or a mobile computer, provided the mobile device also contained a visual display, a Wi-Fi compatible antenna, and a manual input. Typically, the ICIS will receive its directional and selective inputs through the directional pad 16 or a keypad 17. However, on a mobile device where the screen 14 is a touch screen or otherwise able to receive input directly through user contact with the surface of the screen 14, all available selections will recognize inputs directly from the screen.

In the screen 14 of the handset 13, the ICIS is shown downloading the local auxiliary data for Shopping Center. The download of auxiliary data occurs in the start up phase of ICIS user app, or when a user first accesses ICIS at a particular location. ICIS user app that was already preloaded onto the handset 13 will use the local auxiliary data to customize and provide up to date information for the ICIS for whatever location that is providing the ICIS and the local auxiliary data. In the screen shot shown on the screen 14, the ICIS provides a status description 18, which displays what task the ICIS is current performing. The text of the status description 18 will differ depending on what task is being performed. For example, ICIS will provide a status description 18 while performing other tasks, such as "Loading Local Map" and "Performing Search." In such cases, the text of status description 18 will reflect what task is being performed.

The location description 19 underneath the status description 18 will specify the specific location in which the ICIS is operating. As the location providing the ICIS can vary, the location description 19 will differ depending on where the user is accessing the ICIS. FIG. 2 shows the ICIS being accessed by a user in "Shopping Mall." However, if the ICIS were to be accessed at "Movie Theater," "Museum," or "Ski Slope," the text of the location description would reflect the actual location. The progress bar 20 provides a visual representation of current progress the mobile device has made in performing the task identified in the status description 18. In FIG. 2, the progress bar 20 reflects progress in downloading the local auxiliary data.

Referring now to FIG. 3, once the download of local auxiliary data has completed, the ICIS user app will briefly integrate the data and then open the ICIS Main Menu page 21, shown here on the screen 14. The ICIS Main Menu page 21 lists the services that are available in the ICIS. The default services provided comprise a local news and events service, available under the News/Events link 30, a local map service, available under the Maps link 40, a local search service, available under the Search link 50, and an interpersonal communication service, available under the Local Contacts link 60. Whenever a service has new or recently updated information, the link will be starred 22. The basis for each service is coded into the ICIS user app that is installed on the mobile device, however, the location data that each service uses to enable the location specific features are found in the auxiliary local data download. The ICS Main Menu page 21 also provides access to a settings screen, available under the Settings link 70. The settings screen is where a user can exit the ICIS or perform maintenance functions on the local copy of the ICIS, including downloading a new copy of the ICIS user app or re-downloading the local auxiliary data.

Referring now to FIG. 4, the News and Events page 31 is shown on the screen 14. A back navigator button 32 allows a user to navigate from the News and Events page 31 to the ICIS Main Menu page 21. The ICIS provider can input and broadcast various messages and scheduling announcements in this section by entering the information into the ICIS host system. Such information will be downloaded as part of the local auxiliary data and will be accessible through the link 33 relevant to the message's topic. In FIG. 4, the user could access a message about extended hours or about the holiday schedule by selecting the corresponding link on the News and Events page 31. Any link that has new or recently updated information will have a star 34 next to it.

Figure 5:
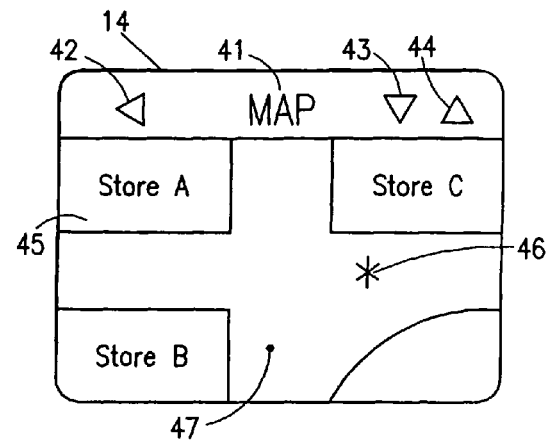
FIG. 5 shows a front plan view of the screen of a cell phone having Wi-Fi access that includes the ICIS user app described herein.

Referring now to FIG. 5, the Map page 41 is shown on the screen 14. A back navigator button 42 allows a user to navigate from the Map page 41 to the ICIS Main Menu page 21. Typically, the Map page 41 will displace a map of the ICIS provider's location. This map is downloaded as part of the local auxiliary data download and therefore is specific to the location in which the ICIS is being accessed. A zoom in button 43 and zoom out button 44 are provided to allow the user to manipulate the zoom of the map. Depending on the level of detail provided by the ICIS provider and the zoom, physical features within the location, such as a store in a shopping center 45, will be visible in the map. In addition, if the handset 13 is equipped with GPS, the map will provide additional functionality in that it will provide the user's position 46 in real time by overlaying the location of the handset 13 onto the map. If any of the user's contacts are present in the location and have a handset 13 equipped with GPS, the map will provide the contact's position 47 in real time by overlaying the location of the handset 13 onto the map.

Preferably, a method is additionally provided for

Figure 6:
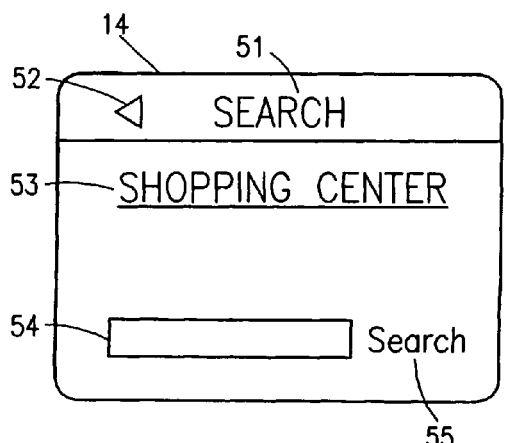
FIG. 6 shows a front plan view of the screen of a cell phone having Wi-Fi access that includes the ICIS user app described herein.

Referring now to FIG. 6, the Search page 51 is shown on the screen 14. A back navigator button 52 allows a user to navigate from the Search page 51 to the ICIS Main Menu page 21. The Search service provides the user with the ability to search locally for stores, products or services using keywords and phrases. A user looking for a particular store or item can enter the store name or the item name and the Search service performs the search by accessing the search engine found in the host computer 11 and displaying the results on the screen 14 (not shown). The location name 53 is displayed prominently on the Search page 51 and the text box 54 is positioned under the location name 53. The Search is initiated by entering the keyword or phrase into the text box 54 and selecting the Search link 55.

Figure 7:
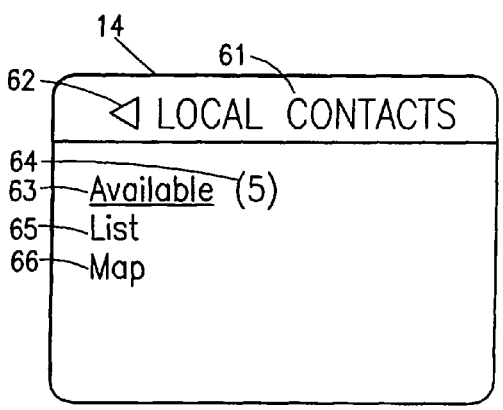
FIG. 7 shows a front plan view of the screen of a cell phone having Wi-Fi access that includes the ICIS user app described herein.

Referring now to FIG. 7, the Local Contacts page 61 is shown on the screen 14. A back navigator button 52 allows a user to navigate from the Local Contacts page 61 to the ICIS Main Menu page 21. The Local Contacts page 61 provides a list of all of the contacts whose information is stored on the user's handset 13 that are currently accessing in to the same ICIS host. The contacts are identified by matching the information such as phone number and email address to that of mobile devices that are currently accessing the ICIS host. The user's contacts that are accessing the same ICIS host are placed in the Available 63 category. The number of contacts that are in the Available category at a given time is reflected in a contact tally 64. The ICIS allows the user to view the available contacts in list form by selecting the List link 65. In addition, for any contact that is using a mobile device that includes GPS service, the Map link 66 will all the user to view such contacts on a map of the location. The map will be similar to the map found on the Map page 41.

The Local Contacts page is also where a user can initiate the interpersonal communication service. The interpersonal communication service allows a user to communication with the user's contacts who are accessing the same ICIS host computer. When viewing available contacts through the List link 65 (not shown), a user can select an available contact and invite the available contact to join a chat room. The chat rooms are hosted on the local ICIS host computer and allow handsets 13 that are accessing the same ICIS host computer to communicate through the local Wi-Fi connection and in a manner that is not dependant on the user having access to cell phone antenna signals or other non local communication service providers.

A setting in which the ICIS can be particularly useful is a ski slope. In a ski slope setting, the ICIS will allow the proprietor the ability to post relevant news items such as slope closings or slope openings, provide a map detailing the location and difficulty of the different slopes, and allow the user to perform keyword searches in order to gather all information specific to a given keyword. In addition, the patron using the ICIS could communicate with friends or family while located anywhere on the ski slope that was within range of the ICIS data transmission signal. Advantageously, this allows the user to maintain communications whether or not the ski slope location is within range of a cell phone tower. Moreover, for patrons using the ICIS that have a GPS enabled mobile device, the ICIS will greatly assist these GPS enabled patrons locate friends and family who are also present on the ski slopes.

The present invention can be very useful in selecting the correct slope to ski on using a locally generated slope map that clearly delineates the degree of difficulty of each slope available to the user from green to black diamond indications on the slope map generated on the user's screen.

Similarly, the ICIS is useful in a museum setting, such as an art museum. In such a setting, the art museum would be able to provide patrons using the ICIS with routine information such as special exhibits or emergency information such as lost child alerts. In addition, a detailed map of the entire museum and additional information and resources can be made available through keyword searches. The interpersonal communication system provides a very efficient means of allowing large or small groups to stay together and to remain in close contact, especially because often time an indoor museum setting does not provide access to regular cell phone signals.

The museum can have interactive displays at each painting or sculpture exhibit that transmits information while the user is standing in front of a specific exhibit concerning the history or description of the exhibit. The user can also use the mobile device to locate a specific exhibit in the museum with a locally generated map of the museum to find a desired exhibit.

Figure 8:
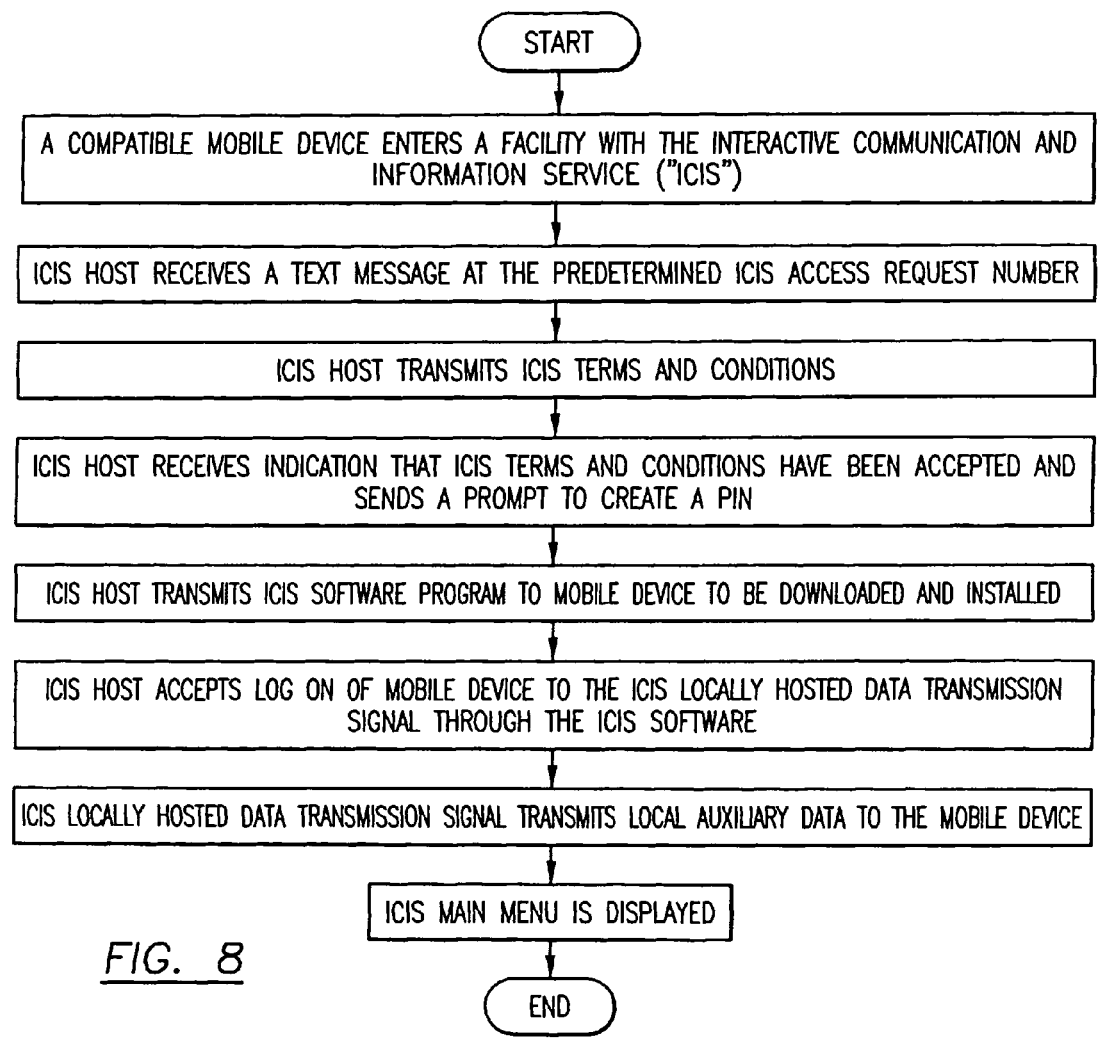
FIG. 8 shows a flow chart showing a process of accessing the ICIS for the first time in accordance with a first embodiment of the invention.

Referring now to FIG. 8, a first method for which a user registers and initially accesses the ICIS is detailed. When a mobile device that is able to transmit and receive information on a Wi-Fi network enters a facility with ICIS, the mobile device must indicate to the ICIS host computer that it would like access to the network. This can be done by sending a text message to the ICIS host computer at a number specified within the host location or by simply attempting to access the ICIS data transmission signal. Once receiving a request, the ICIS host transmits the applicable terms and conditions that all users must accept in order to access the ICIS. Once the ICIS host receives indication that the ICIS terms and conditions have been accepted, the ICIS host sends a prompt to the mobile device instructing it to create a personal identification number ("PIN"). Users with a PIN are able to bypass the terms and conditions step on subsequent logins. Next, the ICIS host transmits ICIS user app program to the mobile device to be downloaded and installed. Once the installation is complete, the user can log in to the ICIS host through the locally hosted ICIS data transmission signal through the ICIS software. During the log in process, the phone number or email addresses of the mobile device is temporarily stored in the ICIS computer host. The phone numbers and email addresses are stored in an active roster as long as the corresponding mobile device remains logged on to the ICIS computer host. Once logged in, the locally hosted ICIS data transmission signal transmits local auxiliary data to the mobile device. Upon completion of the auxiliary download, the ICIS main menu is displayed and the mobile device can access all of the services available under the ICIS.

Figure 9:
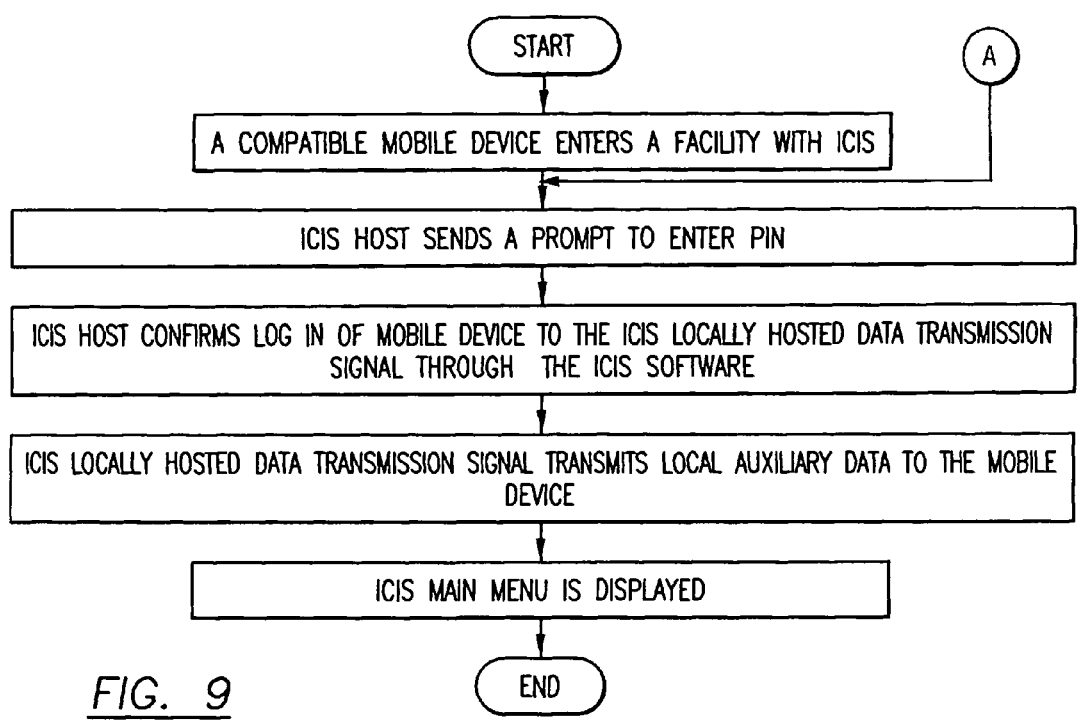
FIG. 9 shows a flow chart showing a process of accessing the ICIS on a device that has accessed the ICIS previously.

Referring now to FIG. 9, when a mobile device that has already registered for ICIS and already has the requisite ICIS user app enters a facility with ICIS, the user accesses the ICIS through the ICIS user app already on the phone. Upon receiving the request from the mobile device, the ICIS host sends a prompt, requiring the user to enter the user's PIN. Once the ICIS host confirms PIN and the log in of mobile device, it transmits through the locally hosted ICIS data transmission signal the local auxiliary data specific to the ICIS facility that is being accessed. Once the mobile device has completed downloading the local auxiliary data, the ICIS main menu is displayed and the mobile device can access all of the services available under the ICIS.

Figure 10:
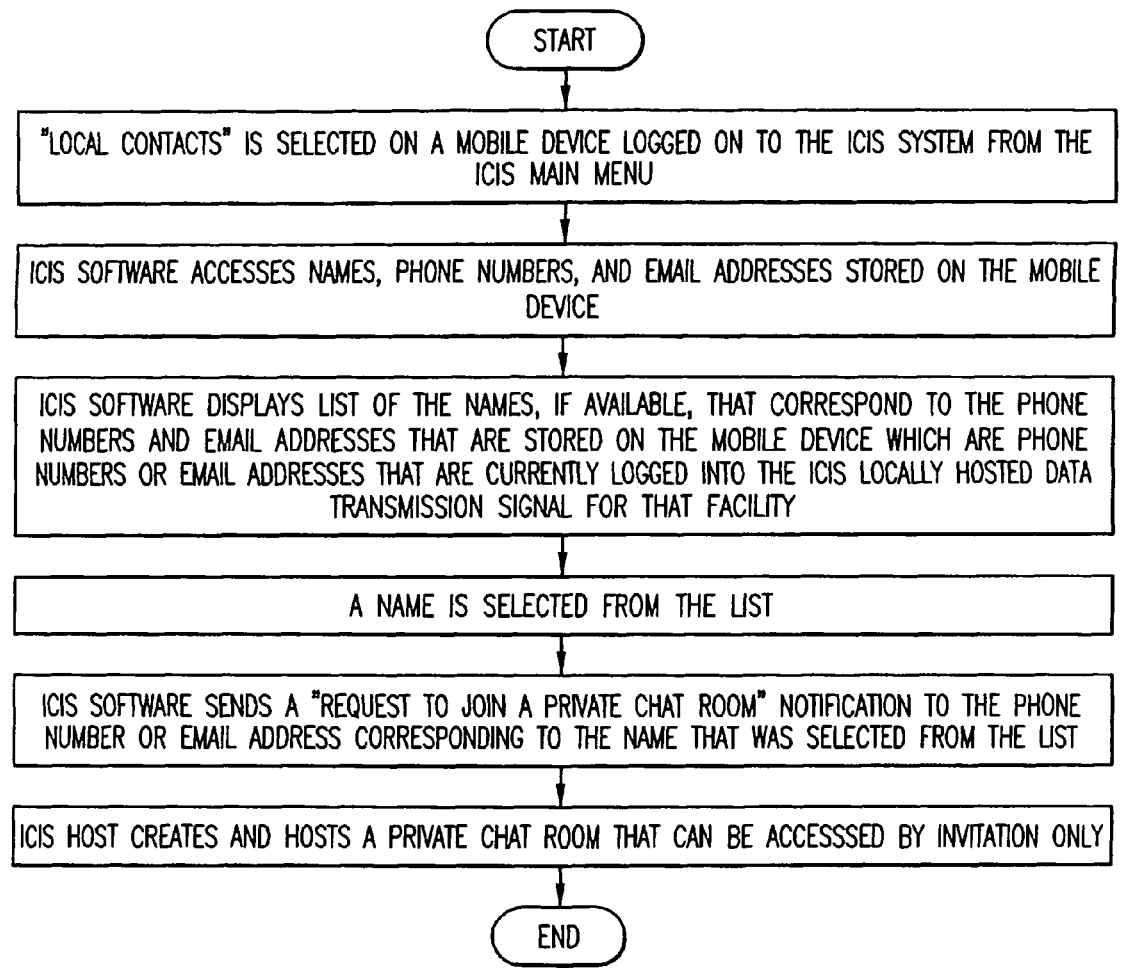
FIG. 10 shows a flow chart showing a process of accessing the ICIS' interpersonal communication service.

Referring now to FIG. 10, the use of the interpersonal communication service is described. From the ICIS Main Menu, a user would select the Local Contacts link. When this link is accessed, the ICIS user app scans the user's mobile device for all phone numbers and email address that are listed in the phone book or contacts section of the mobile device and matches the phone numbers and email addresses to the corresponding name as listed in the mobile device. Next, the ICIS checks the phone numbers and email addresses in the phone against the active roster and displays list of the names whose phone numbers and email addresses as stored on the mobile device currently match a phone numbers or email address that are currently logged into the ICIS locally hosted data transmission signal for that facility. If a name is selected from the list, the ICIS user app sends a prompt though the ICIS computer host to the phone number or email address that corresponds to the selected name. The prompt causes a request to join a private chat room to appear on the mobile device of the selected name. If the request is accepted, the ICIS host creates and hosts a private chat room in which the mobile devices can privately communicate. The ICIS hosted private chat rooms can host two or more people, however, the private chat rooms can be accessed by invitation only.

In an alternate embodiment of the invention, cloud Internet-based computer services could be used. The computer host in the overall invention could be provided using Internet cloud services. A cloud service provider has a server that could act as the computer host off-site and communicate with a local host computer using the Internet. The facility that uses ICIS thus engages a cloud-based service provider to store and maintain the data necessary for ICIS including the necessary software programs to rum ICIS. Thus the host computer at the facility will be connected to the Internet and to the cloud service provider server that maintains ICIS database information and ICIS software. The purpose of this arrangement is to take advantage of the benefits of cloud computing and reducing the system requirements of the host computer at the facilities.

Referring to FIG. 11, a second embodiment of the invention is disclosed that allows the facility host computer 11 connected to a cloud computer system 68 and to the Internet 70 by any type of Internet connection 72. The cloud computer system 68 can provide the operating software for the particular store facility 10 which would include the latest data and shopping information, including pricing for every item in the store facility 10 on every shelf. The cloud computing system 68 can also have software to recognize a user account in facility 10 with a smart phone including ICIS software in accordance with the invention. Thus, the facility host computer 11 using its wireless transmission capability 12 can interact with a user ICIS device that provides specific interactive information to a user physically located in facility and that interacts with wireless transmissions and the cloud computer system 68.

For example, a server 110, which may form part of a cloud computing platform, is additionally connected to the Internet 70. The server 110 has access to ICIS software 114, which is a software program specific to the facility 10, and which operates in accordance with the invention to provide navigation information and other messages to the cell phone 13, using navigation parameters, relating to the physical characteristics of the facility 10, stored within a navigation parameter data structure 115, and providing messages relating to the items 114 from data stored within the message data structure 116. The local navigation subroutine 114 may additionally have access to a device data structure 117, storing data identifying portable electronic devices, such as the cell phone 13, that have been used with the ICIS software within the facility 10 in the past, together with information describing the items that were previously selected using each of the portable electronic devices.

For example, the system 100 includes an administrative client system 118 that accesses the server 110 to load and update navigation parameters 115 and the message data structure 116. The server 110 is accessed by both the administrative client system 118 and the portable electronic devices 102. The local navigation subroutine 114 then causes the smart-phone data structure 117 to be updated with information describing each item selected using a mobile device 102. The facility 10 may be one of a plurality of facilities, including a second facility 119, associated with a second administrative client 119a. Access to different versions of the ICIS software 114, each associated with a facility within the plurality of facilities 10, 119a, are then provided to through the server 110, as shown in FIG. 12.

Figure 13:
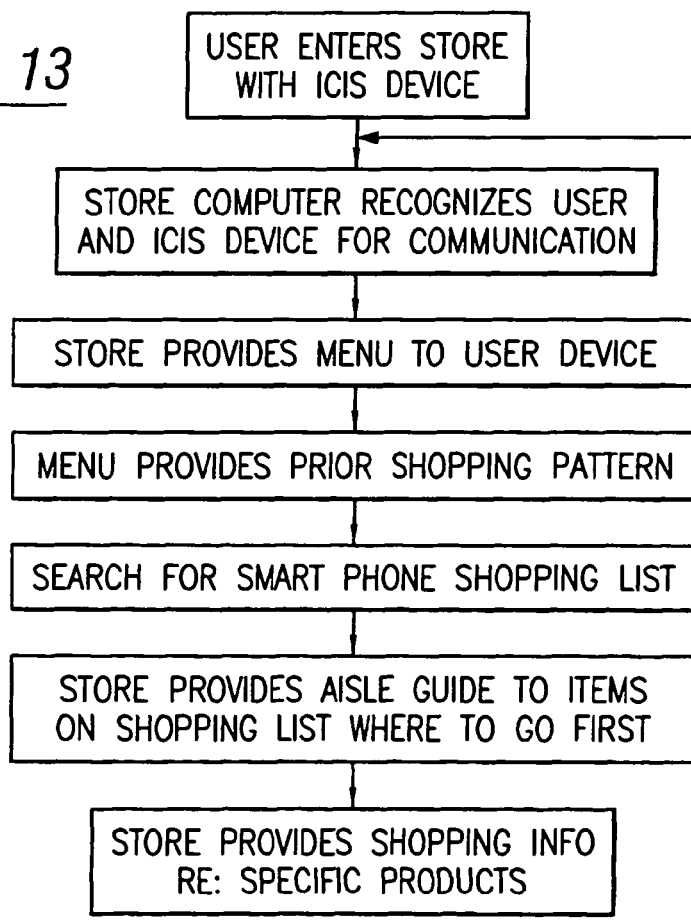
FIG. 13 is a flow chart of the second embodiment showing use of the system in a grocery store with a smart communication device.

Alternately, as shown in FIG. 13, a common version of the ICIS software 114 may be used to access data stored within different versions of the navigation parameters 115, the message data structure 116, and the device data structure 117 to provide data for use with portable electronic devices, such as the cell phone 13, in different facilities 10, 119a. It is noted that the common version of the ICIS software becomes specific to one of the different facilities when it operates with data for that facility.

FIG. 13 is an example of the alternate embodiment of the invention that uses a smart device with ICIS software to provide specific product information to a user including location in the facility store 10. In the first step the user enters a store with a smart ICIS device. The store host computer connected to cloud computing system 68 recognizes the user and the ICIS device and the devices begin to communicate with each other and interact. The facility store 10 can thus provide an electronic menu to the user device or obtain one from the user device if previously used or a prepared shopping list specifically for the facility store. The store facility host computer could provide a menu to the user device based on previous user shopping trips with respect to a shopping list. The store facility computer transmissions would also provide a physical description of the location by aisle as a user guide to items that are on the shopping list and where to go in the store aisle first. Along with this, the store facility computer would be providing overall shopping information regarding specific products, pricing, current sales, and a plethora of other information that would be invaluable to the shopper. For example, the store computer database could remind the user that the user has not purchased milk for over a week or other items that are purchased a cyclical basis. The user could scan cookbook recipes into the smart phone and use such recipes in conjunction with the store facility computer and the cloud database to provide the exact location of all the items needed in the recipe. The store could also print out and provide electronically coupons that are available to the specific items on the shopping list. The store could also suggest substitute values and items that are on sale.

Figure 12:
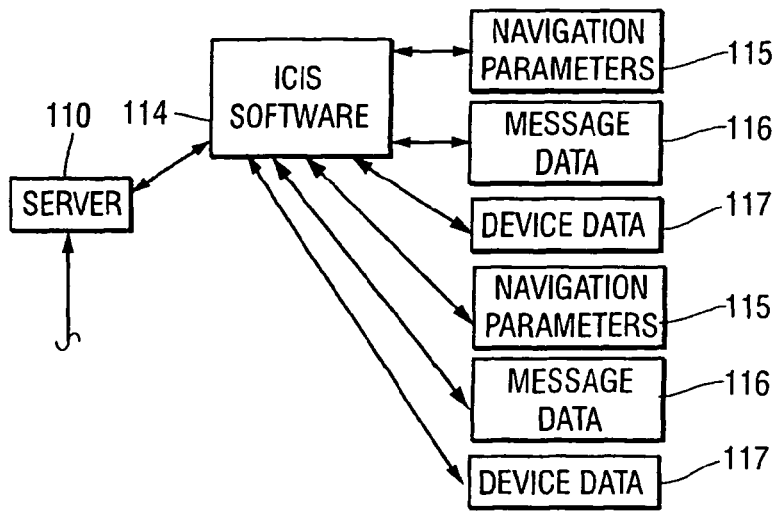
FIG. 12 shows an alternative structure for providing the ICIS software through a server.

In the second embodiment shown in FIGS. 11-13, the example used is a grocery store. The same type of interactive communication at the customer level in a specific store could also apply to a museum, a convention center having numerous vendor booths, a hardware store, or any store that has a numerous variety of products for sale. The interactivity between the cloud-based computer system and the tremendous data bank available to the store facility as to all of its products in each of its stores coupled with the user smart device could incredibly expedite shopping trips while the same time giving the consumer the best possible bargains while at the same time, the store facility is promoting its products.

Figure 14:
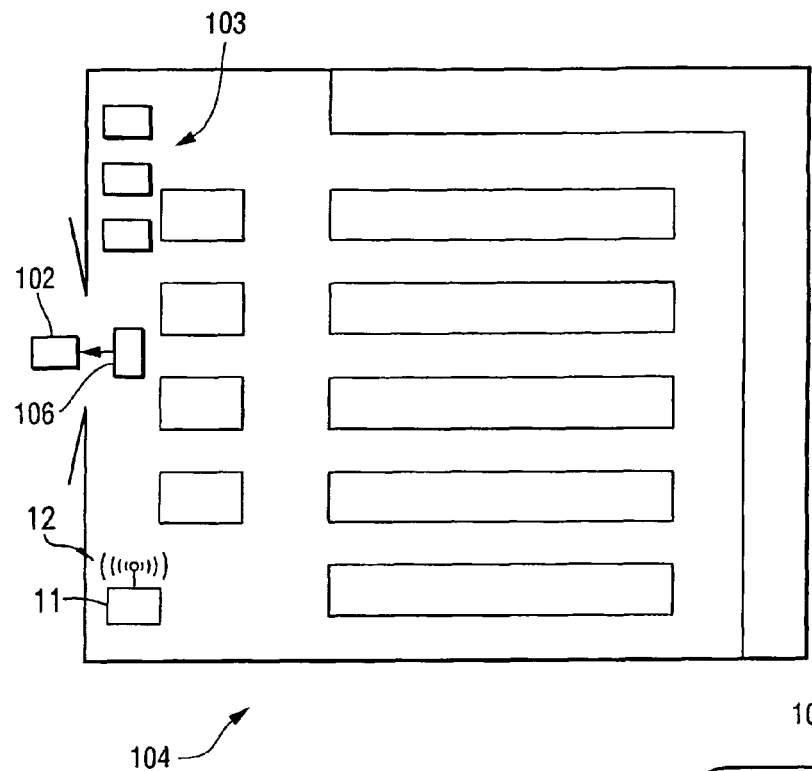
FIG. 14 is a top plan view of a facility built in accordance with a third embodiment of the invention.

FIG. 14 is a top plan view of a facility 104 built in accordance with a third embodiment of the invention to include a machine-readable tag 106 that is specific to the facility 104 and that can be read by a mobile device 102 to provide a means for connecting the mobile device 102 with a computer system or network associated with the shopping center 90. It is understood that the mobile device 102 becomes one of a plurality 103 of participating mobile devices that are made visible to one another and connected to one other and connected to one another through a local interpersonal communication service in accordance with the invention.

Figure 15:
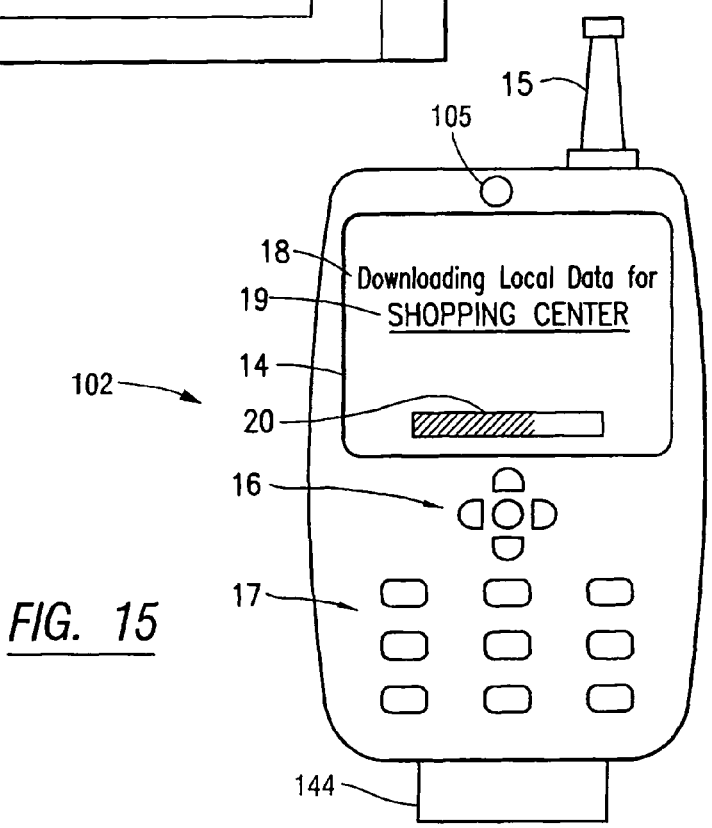
FIG. 15 shows a front plan view of a mobile device built in accordance with the third embodiment of the invention.

FIG. 15 shows a front plan view of the mobile device 102 built in accordance with the third embodiment of the invention, which is, for example, a currently available smartphone without modification except for the addition of software in the form of the ICIS user app 120 (shown in FIG. 16) providing for operation in accordance with the invention. The mobile device 102 includes a camera that is now conventional within smartphones, using a lens 105.

Figure 16:
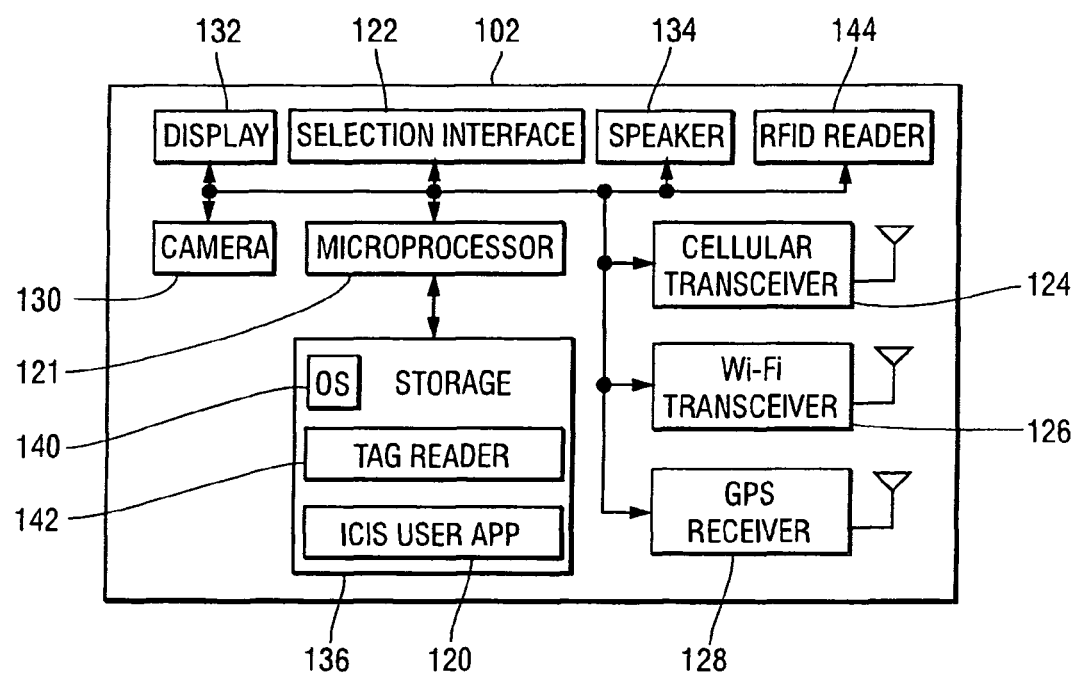
FIG. 16 is a schematic view of the mobile device of FIG. 15.

FIG. 16 is a schematic view of the mobile device 102, which includes a microprocessor 121 configured to receive inputs from a person using the mobile device 102 through a selection interface 122, to receive inputs developed from wireless signals received by a cellular transceiver 124, a Wi-Fi transceiver 126, and a GPS receiver 128, and additionally to receive an input from an internal camera 130. The microprocessor 121 is further configured to provide output signals driving a display 132 and a speaker 134 and to execute program instructions from apps stored within data and program storage 136. For example, the selection interface 122 may be one or more of a number of such devices that are well known to those skilled in the art of designing cellular phones, such as the keyboard 17, as shown in FIG. 14, with physical keys, or a touch screen device used in conjunction with the display 132 to display keys and icons which are touched to provide inputs to the microprocessor 121. Data and instruction storage 136 includes an operating system 140, which is used by the microprocessor 121 to maintain data files, to run apps, and to operate various devices within or attached to the mobile device 102.

Data and instruction storage 136 additionally includes a tag reader app 142 that receives information read from the machine readable tag 106, generates an address of the server 110, and causes the mobile device 102 to be connected to the server 110 over a network, such as the Internet 70. For example, the machine readable tag 106 may display a type of bar code known as a QR bar code, while the tag reader app 142 is of a type that is currently widely available as a free download to a smartphone for reading QR bar codes, and for causing the mobile device 102 to contact a website identified by data stored within the machine readable tag 106 when the machine readable tag 106 is photographed using the internal camera 130 within a mobile device 102, such as a smartphone. Alternately, the machine readable tag may be an RFID tag, while the mobile device 102 includes an RFID reader 144, and while the tag reader app 142 causes input data developed from reading the RFID tag to generate an address locating the server 110.

The mobile device 102 may be a conventional smartphone with no modification other than the software modification provided by installing the ICIS user app 120. However, the mobile device 102 may alternately be another type of device having certain capabilities described in reference to FIG. 2. For example, since operation of the system 100 in accordance with the first embodiment of the invention does not require connection of the mobile device 102 to a cellular data network, the mobile device 102 may be a laptop computer, with the ICIS user app 120 being an application executing on the laptop computer.

Figure 17:
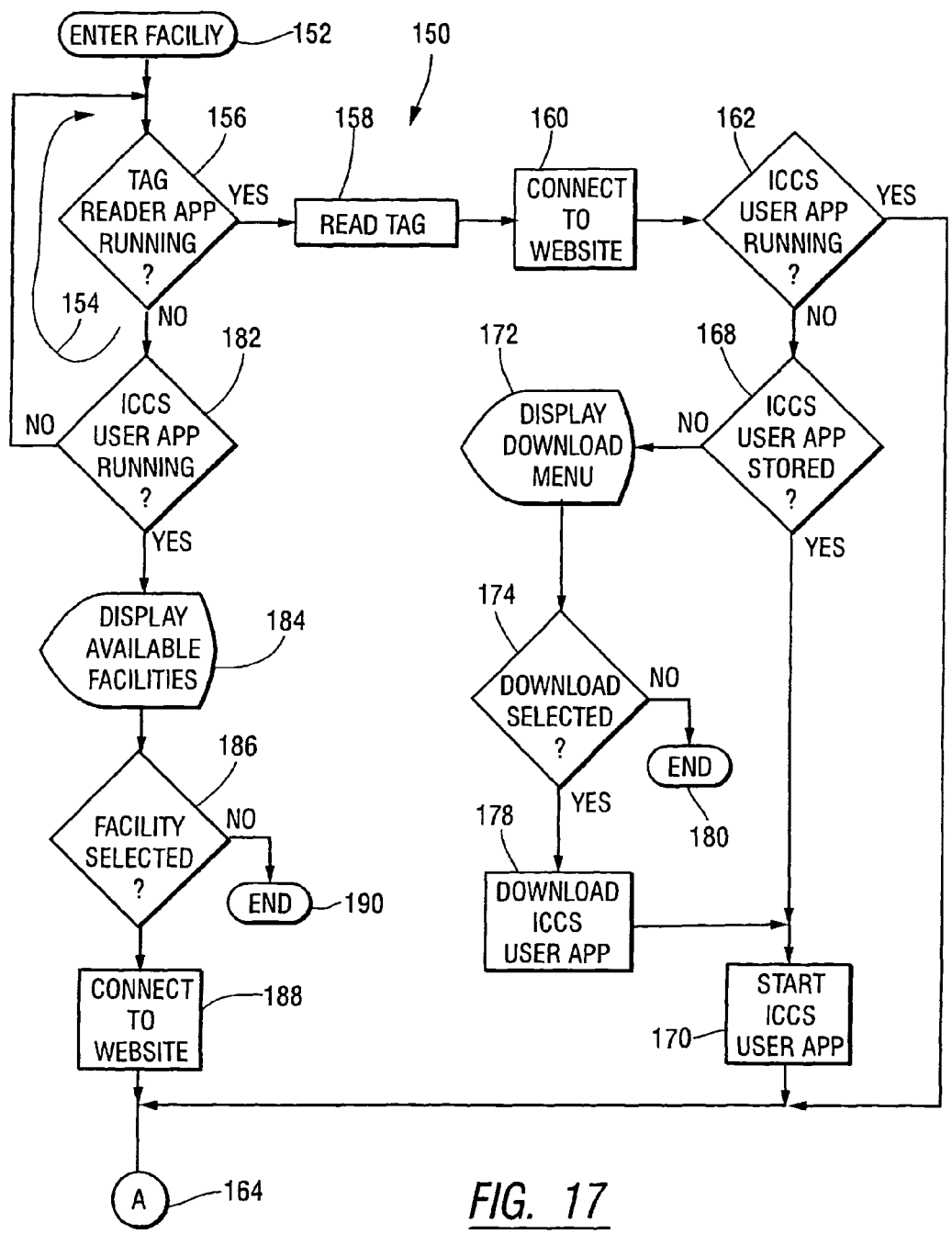
FIG. 17 is a flow chart showing a process for initializing the ICIS software according to the third embodiment of the invention.

FIG. 17 is a flow chart showing an initialization process 150 for initializing the ICIS user app for use within the facility 104. For example, when an individual using the mobile device 102 enters the facility 104, communication between the Wi-Fi transceiver 126 within the mobile device 102 and the Internet 70 is preferably established by conventional means through the access point 108. Other types of communication with the Internet 70, supported by the mobile device 102 and the surrounding environment may be alternately be used, but the use of the access point 108 is preferred because the structures within or adjacent to the facility 104 may block communications not using the access point 108. In accordance with the third embodiment of the invention, after entering the facility 104, an individual using the mobile device 102 can begin the initialization process 150 either by causing the tag 106 to be read with the tag reader app 142 running or by using the ICIS user app 120. In the figure, this choice is shown as proceeding through a loop 154 after entering the facility 104 in step 102. If neither the tag reader app 142 nor the ICIS user app 120 is running, the user (i.e. the individual using the mobile device 102) can select either of these apps to start running before beginning the initialization process, or, if necessary, the user can download either or both of these apps by conventional processes over the Internet 70.

If the tag reader app 142 is running, as determined in step 156, and if the machine readable tag 106 is read in step 158, the tag reader app 142 causes the mobile device 102 to be connected to the server 110 in step 160. For example, if the machine readable tag 106 is a QR tag, the user photographs the QR tag in step 158, with the tag reader app 142 then causing the mobile device 102 to connect to a website hosted by the server 110 in step 160. Then, if a subroutine running within the server 112 determines in step 162 that the ICIS user app 120 is running within the mobile device 102, the initialization process 150 is successfully ended at exit point A, indicated as 164. On the other hand, if it is determined in step 162 that the ICIS user app 120 is not running within the mobile device 102, the server 112 makes a further determination in step 168 of whether the ICIS user app 120 is stored within the mobile device 102. If it is, the ICIS user app 120 is started in step 170, with the initialization process 150 being successfully completed at exit point A, indicated as 164. If it is instead determined in step 168 that the ICIS user app 120 is not stored within the mobile device 102, the display 130 of the mobile device 102 displays, in step 172, a menu asking the person using the mobile device 102 if he wishes to download the app 120. If it is then determined in step 174 that a selection has been made to download the ICIS user app 120, this app 120 is downloaded in step 178, preferably from the server 112. Then the ICIS user app 120 is started in step 170, with the initialization process 150 being successfully ended at exit point A, referenced as 164. If it is determined in step 174 that a selection has been made not to download the ICIS user app 120, the initialization process 150 is ended in step 180.

According to a preferred version of the third embodiment of the invention, the ICIS user app 120 provides a capability for determining whether the mobile device 102 is within a facility 104 operating in accordance with the invention, with this determination being made by identifying a portion of the content of an output signal from the access point 108. Therefore, if it is determined in step 182 that the ICIS user app 120 is running, this app 120 causes data describing the facility 104 to be displayed in step 184 on the display 132 of the mobile device 102. If the mobile device 102 is within range of access points from more than one facility, a list of available facilities is presented on the display 132. If the facility 104 is then selected, as determined in step 186, the mobile device 102 is connected to the website hosted by server 110 through the Internet 70 in step 188, with the initialization process 150 being successfully ended at exit point A, referenced as 164. If the facility 104 is not selected in step 186, the initialization process is ended in step 190.

The third embodiment of the invention, as described above in reference to FIGS. 14-17, can be used with either the first embodiment of the invention, as described above in reference to FIGS. 1-10, or with the second embodiment of the invention, as described above in reference to FIGS. 11-13. When the third embodiment is used with the first embodiment, upon leaving the exit point A in FIG. 17, the process enters the previously-described process of FIG. 9 at entry point A. When the third embodiment is used with the second embodiment, upon leaving the exit point A, the process enters the previously-described process of FIG. 12 at entry point A.

Since the individual using the mobile device 102 is provided with a choice between using a camera 130 to photograph the Bar code tag in and performing a selection of an available facility from a list displayed in step 184, it is understood that the initialization process 150 can be performed by making this selection in step 184 while using a mobile device 102 not having a camera 130.

Figure 18:
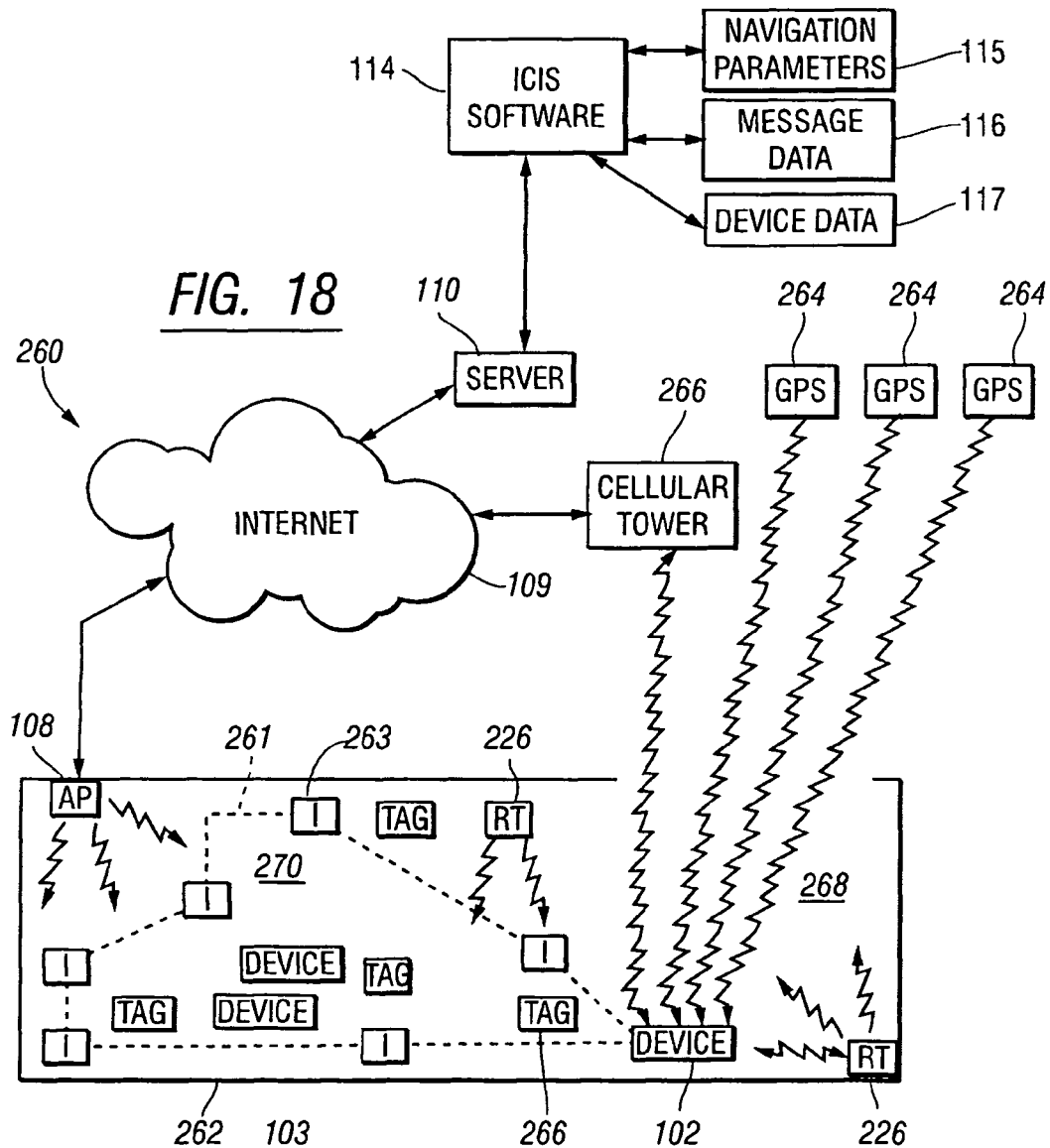
FIG. 18 is a top plan view of a system built in accordance with a fourth embodiment of the invention.

FIG. 18 is a schematic view of a system 260 configured in accordance with a fourth embodiment of the invention to provide multiple modes of determining a location within a facility 262 and multiple modes for communication between the mobile device 102 and the server 110, which provides access to ICIS software 114, to navigation parameters 115 used to determine locations within the facility 262, to message data 116 used to provide messages or advertisements relevant to the facility 262, and to device data 117 storing the results of past experiences using the particular mobile device 102 within the facility 262. For example, the system 260 is used to establish a path 261 for visiting a number of items 262 and for establishing communications with other mobile devices within a plurality 103 of mobile devices within the facility 262.

For example, the mobile device 102 within the system 262 is a conventional smartphone, having a GPS receiver 128 and a cellular transceiver 124, as shown in FIG. 15, which is therefore capable of determining its location from signals received from a plurality of satellites 264 within the global positioning system (GPS), and which is further capable of determining or refining its position by triangulation using signals received from two or more cellular towers 266. A conventional smartphone is capable of communicating through the cellular transceiver 124 with a high-speed data network provided through a cellular tower 266, in addition to being capable of communicating through the Wi-Fi transceiver 126 with a Wi-Fi access point 108. One problem with using signals from GPS satellites 264 and from the cellular tower 266 arises from the fact that the reception of such signals is often unreliable within covered structures due to the reflection and attenuation of the signals by elements within the structures. Within the system 260, this problem is alleviated by providing for the use of multiple modes for determining the location of the mobile device 102 and for communication between the mobile device 102 and the server 110.

One mode for determining the location of the mobile device 102 within the facility 262 relies on radio-frequency signals generated within the facility 262 to be received by the mobile device 102, for example through its Wi-Fi transceiver 126. Such signals may be generated by one or more Wi-Fi access points 11, by one or more radio-frequency generators 226, or by a combination of one or more Wi-Fi access points 11 and one or more radio-frequency generators 226, with the signal strengths of the generated signals forming a pattern that is used to determine the location of the mobile device 102 within the facility. For example, the navigation parameters 115 accessed by the server 110 describe the location of a device, such as the mobile device 102 within the facility 262 as a function of the field strength of the radio-frequency signals generated within the facility 262, with this function either being applied either through the use of ICIS software 114 running within the server 110 to signal strength data measured by the mobile device 102 and uploaded to the server 110, or through the use of the ICIS user app 120 (shown in FIG. 16) running in the mobile device 102 with information from the navigation parameters 115 having been downloaded from the server 110.

Another mode for determining the location of the mobile device 102 within the facility 262 uses a number of location-specific tags 266, disposed at various locations within the facility 262, with each of the tags, which can be read by the mobile device 102, containing information indicating its location within the facility 262 As described above in reference to FIGS. 16 and 17, these tags 106 may be bar code tags, such as QR tags that are read using a tag reader program 142 running within the mobile device 102. Then, as the mobile device 102 is moved through the facility 262, pictures taken of the machine readable tags 266 with the camera 130 provide the new location data. The location may be determined through the use of the ICIS user app 120 (shown in FIG. 16) running in the mobile device 102 with information from the navigation parameters 115 having been downloaded from the server 110. Communication with the mobile device 102 may be directed to a different web site hosted by the server 110 for each of the tabs 106. With the mobile device 102 additionally including a radio frequency identification (RFID) reader 144, RFID tags can be used to provide this navigation function, with new location data being generated as the mobile device 102 is brought into proximity with an RFID tag. Alternately or additionally, navigation data generated using additional devices and software routines within the mobile device 108 may be used to determine the location of the mobile device 108 within the facility 262, with such devices and software routines providing compass, accelerometer, and/or altimeter functions.

In the example of FIG. 18, the facility 262 includes an open space 268 and an enclosed space 270, with reliable communications being achieved between the GPS satellites 264 and the mobile device 102 and between the cellular tower 266 and the mobile device 102 in the open space 268, but not in the enclosed space 270. For example, the facility 262 may be automobile dealership, containing items 263 to be visited, in the form of various automobiles that can be selected to see, some of which are in an enclosed garage, which is part of the enclosed space 270, and others of which are in an open lot forming part of the open space 268. In another example, the facility 262 is a shopping center, with the parking area and an outdoor mall forming the open space 268, while a number of enclosed stores and combined to form the enclosed space 270.

Preferably, the ICIS user app 120 includes a subroutine for determining which mode for finding a location of the mobile device 102 is the most reliable and for switching operation of the mobile device 102 as necessary to the more reliable mode. For example, such a determination is made by comparing signal strengths to check for attenuation and by comparing signal quality to check for reflections. Preferably, such a subroutine additionally makes a similar determination of which mode is more reliable for communications. Preferably, the server 110 within the system 260 is connected to a local navigation subroutine 114 as shown in FIG. 1, with navigation parameters being stored in a database 115 for calculating the location of the mobile device 102 through the use of either radio frequency signals from access points 108 and/or radio frequency transmitters 226, or from signals derived GPS satellites 264 and cellular towers 266. Alternately, choices between methods for determining the location of the mobile device 102 and between methods of communication with the server 110 may be provided by the individual using the mobile device 102, either as inputs to the local navigation program 120 or by means provided within a conventional smartphone, such as enabling or disabling GPS services and turning the Wi-Fi transceiver 126 on or off. Location information determined in this way may be used to update the position of an icon on a map display discussed above in reference to FIG. 5 and to provide location information to contacts found as discussed above in reference to FIG. 10.

The technology described here can work with Wi-Fi and Bluetooth, near field communications, internal GPS, QR Reader and with any smart device including phones or tablets. The connections can be even between items in the device, between different devices at the same location between items through the cloud back to the device.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for providing a local network based within a facility, wherein the system provides local information and access to a local interpersonal communication service, and wherein the system comprises:
   a host computing system;
   a facility-specific, machine readable tag including information identifying the facility;
   one or more participating mobile devices, each comprising a visual display, each adapted to contact the host computing system in response to reading the facility-specific, machine readable tag, and each adapted to transmit and receive data over a facility-hosted data transmission signal, wherein the data transmission signal enables transmission of electronic data between the host computing system wirelessly between the one or more participating mobile devices;
   an information and communications software program loaded within each of the one or more participating mobile devices, wherein the information and communications software program is adapted to provide the one or more participating mobile devices with local and facility information and access to the interpersonal communication service, wherein the information and communications software program enables the data transmission signal to uniquely identify the one or more participating mobile devices, wherein the information and communications software program enables the one or more participating mobile devices to transmit data over the data transmission signal, wherein the local interpersonal communication service enables the participating mobile devices identified by the information and communications software program to be visible to others of the participating mobile devices identified by the information and communications software program, and wherein messages can be sent and received among the participating mobile devices identified by the information and communications software program over the data transmission signal.

2. The system of claim 1, wherein
   the host computing system is connected to a Wi-Fi access point within the facility, and
   the one or more participating mobile devices are each adapted to contact the host computer through the Wi-Fi access point in response to reading the facility-specific, machine readable tag.

3. The system of claim 1, wherein
   the host computing system comprises a server connected to the Internet, and
   the one or more participating mobile devices are each adapted to contact the host computer through the Internet in response to reading the facility-specific, machine readable tag.

4. The system of claim 1, wherein
   the system additionally comprises a plurality of location-specific, machine-readable tags placed at a plurality of locations within the facility,
   information contained within each tag identifies a location within the plurality of locations in which the tag is placed,
   the one or more participating mobile devices are each additionally adapted to read each of the location-specific machine-readable tags and to generate location-specific data from the information contained within the tag, and
   the system additionally comprises a facility-specific software program loaded within the host computing system, wherein the facility-specific software program is provided with access to a location data structure identifying each location within the plurality of locations from the information contained in the tag placed at the location; and the information and communications software program is additionally adapted to operate with the facility-specific software program to determine a location of each of the location-specific machine readable tags from information read from the tag.

5. The system of claim 4, wherein each machine readable tag comprises a bar code including information identifying an address of the host computing system, each of the one or more participating devices includes a digital camera, and the system additionally comprises an initialization software program loaded within each of the one or more participating mobile devices, wherein the initialization software program is adapted to cause the one or more participating mobile devices to contact the host computing system having an address identified by the bar in response to taking a photograph of the bar code.

6. The system of claim 4, wherein each machine readable tag comprises a radio-frequency identification code device emitting a radio-frequency signal including information identifying an address of the host computing system, each of the one or more participating devices includes a radio-frequency identification reader reading the radio-frequency signal, and the system additionally comprises an initialization software program loaded within each of the one or more participating mobile devices, wherein the initialization software program is adapted to cause the one or more participating mobile devices to contact the host computing system having an address identified by a signal read by the radio-frequency identification reader.

7. The system of claim 1, wherein the system additionally comprises a plurality of radio-frequency transmitters at a plurality of locations within the facility, and a facility-specific software program loaded within the host computing system, the facility-specific software program is provided with access to a location data structure identifying a location among a plurality of locations within the facility from levels of output signals from the plurality of radio-frequency transmitters, and the information and communications software program is additionally adapted to operate with the facility-specific software program within a mobile device to determine a location of each of the mobile devices from signal strength information read by the mobile device.

8. The system of claim 1, wherein each of the participating mobile devices is adapted to establish a connection with the host computing system through a Wi-Fi access point and alternatively through a cellular communications tower in response to determining the qualities of signals from the access point or the cellular communications tower.

9. A method for providing a local network based within a facility, wherein the local network provides local information and access to a local interpersonal communication service, and wherein the method comprises the steps of:

hosting a facility hosted data transmission signal that enables the transmission of electronic data wirelessly between a computer host associated with the facility and one or more participating mobile devices and also enables the transmission of the electronic data wirelessly between two or more of the participating mobile devices, the mobile devices comprising a visual display and adapted to transmit and receive data over the local data transmission signal;

providing a facility-specific, machine readable tag, including information identifying an address of the computer host associated with the facility;

establishing a connection between the computer host associated with the facility and one or more of the participating mobile devices in response to the one or more of the participating mobile devices reading the information identifying the facility from the facility-specific, machine readable tag, by each participating mobile device, providing an information and communications software program to be loaded onto the one or more participating mobile devices, wherein the information and communications software program receives facility-specific auxiliary data and provides the one or more participating mobile devices with local and facility information and access to the interpersonal communication service; wherein the software program enables the transmission signal to identify the mobile device and enables the mobile device to transmit data over the transmission signal and receive data originating locally on the transmission signal; and enabling, by the local interpersonal communication service, the participating mobile devices identified by the software program to be visible to other of the participating mobile devices identified by the software program wherein messages can be sent and received among the participating mobile devices identified by the software program over the facility hosted data transmission signal.

10. The process of claim 9, wherein the host computing system is connected to a Wi-Fi access point within the facility, and the one or more participating mobile devices are each adapted to contact the host computer through the Wi-Fi access point in response to reading the facility-specific, machine readable tag.

11. The process of claim 9, wherein the host computing system comprises a server connected to the Internet, and the one or more participating mobile devices are each adapted to contact the host computer through the Internet in response to reading the facility-specific, machine readable tag.

12. The process of claim 9, wherein each machine readable tag comprises a bar code including information identifying an address of the host computing system, each of the one or more participating devices includes a digital camera, and the system additionally comprises an initialization software program loaded within each of the one or more participating mobile devices, wherein the initialization software program is adapted to cause the one or more participating mobile devices to contact the host computing system having an address identified by the bar in response to taking a photograph of the bar code.

13. The process of claim 9, wherein each machine readable tag comprises a radio-frequency identification code device emitting a radio-frequency signal including information identifying an address of the host computing system, each of the one or more participating devices includes a radio-frequency identification reader reading the radio-frequency signal, and the system additionally comprises an initialization software program loaded within each of the one or more participating mobile devices, wherein the initialization software program is adapted to cause the one or more participating mobile devices to contact the host computing system having an address identified by a signal read by the radio-frequency identification reader.

14. A method for providing a local network based within a facility, wherein the local network provides local information and access to a local interpersonal communication service, and wherein the method comprises the steps of:

hosting a facility hosted data transmission signal that enables the transmission of electronic data wirelessly between a computer host associated with the facility and one or more participating mobile devices and also enables the transmission of the electronic data wirelessly between two or more of the participating mobile devices, the mobile devices comprising a visual display and adapted to transmit and receive data over the local data transmission signal;

providing a plurality of location-specific machine-readable tags at a plurality of locations within the facility, wherein each of the machine-readable tags provides information describing a location where the tag is placed;

hosting a facility hosted data transmission signal that enables the transmission of electronic data wirelessly between a computer host associated with the facility and one or more participating mobile devices and also enables the transmission of the electronic data wirelessly between two or more of the participating mobile devices, the mobile devices comprising a visual display and adapted to transmit and receive data over the local data transmission signal;

establishing a connection between the computer host associated with the facility and one or more of the participating mobile devices providing an information and communications software program to be loaded onto the one or more participating mobile devices, wherein the program receives the facility-specific auxiliary data over the transmission signal and provides the one or more participating mobile devices with local and facility information and access to the interpersonal communication service; wherein the software program enables the transmission signal to identify the mobile device and enables the mobile device to transmit data over the transmission signal and receive data originating locally on the transmission signal; and enabling, by the local interpersonal communication service, the participating mobile devices identified by the software program to be visible to other of the participating mobile devices identified by the software program wherein messages can be sent and received among the participating mobile devices identified by the software program over the facility hosted data transmission signal, establishing a connection between the computer host associated with the facility and one or more of the participating mobile devices, providing an information and communications software program to be loaded onto the one or more participating mobile devices, wherein the program receives the facility-specific auxiliary data over the transmission signal and provides the one or more participating mobile devices with local and facility information and access to the interpersonal communication service; wherein the software program enables the transmission signal to identify the mobile device and enables the mobile device to transmit data over the transmission signal and receive data originating locally on the transmission signal, wherein the information and communications software program is additionally adapted to operate with the facility-specific software program to determine a location of each of the location-specific machine readable tags from information read from the tag; and enabling, by the local interpersonal communication service, the participating mobile devices identified by the software program, with their locations, to be visible to others of the participating mobile devices identified by the software program and wherein messages can be sent and received among the participating mobile devices identified by the software program over the facility hosted data transmission signal.

15. The method of claim 14, wherein each machine readable tag comprises a bar code including information identifying a location of the machine readable tag within the facility, each of the one or more participating devices includes a digital camera, and the system additionally comprises a software program to generate data from a digital photograph image taken of a bar code with a camera within each of the one or more participating mobile devices.

16. The method of claim 14, wherein each machine readable tag comprises a radio-frequency identification code device emitting a radio-frequency signal including information identifying a location of the machine-readable tag within the facility;

each of the one or more participating devices includes a radio-frequency identification reader reading the radio-frequency signal, and the system additionally comprises a software program to generate data from the radio-frequency signal.

17. The method of claim 14, wherein the method additionally comprises providing a facility-specific, machine readable tag, including information identifying an address of the computer host associated with the facility, and the connection between the computer host associated with the facility and one or more of the participating mobile devices occurs in response to the one or more of the participating mobile devices reading the information identifying the facility from the facility-specific, machine readable tag, by each participating mobile device.

18. A method for providing a local network based within a facility, wherein the local network provides local information and access to a local interpersonal communication service, and wherein the method comprises the steps of:

hosting a facility hosted data transmission signal that enables the transmission of electronic data wirelessly between a computer host associated with the facility and one or more participating mobile devices and also enables the transmission of the electronic data wirelessly between two or more of the participating mobile devices, the mobile devices comprising a visual display and adapted to transmit and receive data over the local data transmission signal;

establishing a connection between the computer host associated with the facility and one or more of the participating mobile devices, wherein each of the participating mobile devices is adapted to establish a connection with the host computing system through a Wi-Fi access point and alternatively through a cellular communications tower in response to determining the qualities of signals from the access point or the cellular communications tower;

providing an information and communications software program to be loaded onto the one or more participating mobile devices, wherein the information and communications software program receives facility-specific auxiliary data and provides the one or more participating mobile devices with local and facility information and access to the interpersonal communication service; wherein the software program enables the transmission signal to identify the mobile device and enables the mobile device to transmit data over the transmission signal and receive data originating locally on the transmission signal; and enabling, by the local interpersonal communication service, the participating mobile devices identified by the software program to be visible to other of the participating mobile devices identified by the software program wherein messages can be sent and received among the participating mobile devices identified by the software program over the facility hosted data transmission signal.

19. The method of claim 18, wherein
the method additionally comprises providing a facility-specific, machine readable tag, including information identifying an address of the computer host associated with the facility, and
the connection between the computer host associated with the facility and one or more of the participating mobile devices occurs in response to the one or more of the participating mobile devices reading the information identifying the facility from the facility-specific, machine readable tag, by each participating mobile device.

20. The method of claim 19, wherein
the method additionally comprises providing a plurality of location-specific machine-readable tags at a plurality of locations within the facility, wherein each of the machine-readable tags provides information describing a location where the tag is placed,
the information and communications software program is additionally adapted to operate with the facility-specific software program to determine a location of each of the location-specific machine readable tags from information read from the tag; and
the local interpersonal communication service is enabled to identify the participating mobile devices participating mobile devices identified by the software program, with their locations, as visible to others of the participating mobile devices identified by the software program the software program.

\* \* \* \* \*